United States Patent [19]

Remec

[11] 3,858,008

[45] Dec. 31, 1974

[54] LINE BUSYING CIRCUIT

[75] Inventor: Matthew J. Remec, North Riverside, Ill.

[73] Assignee: Phone-Aid Co., Inc., Chicago, Ill.

[22] Filed: May 21, 1973

[21] Appl. No.: 361,952

[52] U.S. Cl. .......... 179/18 AB, 179/18 H, 179/81 R

[51] Int. Cl. .......... H04m 1/00

[58] Field of Search ........ 179/18 H, 18 HA, 18 HB, 179/18 AB, 18 FD, 84 R, 84 L, 81 R, 16 A; 178/2 D, 2 E; 340/147 LP

[56] References Cited

UNITED STATES PATENTS

| | | | |
|---|---|---|---|
| 3,293,370 | 12/1966 | MacLeod | 179/18 AB |
| 3,653,018 | 3/1972 | Budrys | 179/84 R |
| 3,673,339 | 6/1972 | Korn | 179/18 AB |

*Primary Examiner*—Thomas A. Robinson
*Attorney, Agent, or Firm*—Mason, Kolehmainen, Rathburn & Wyss

[57] ABSTRACT

A line busying circuit for busying sequentially subsequent subscriber lines of a telephone system in response to use of a first line in order to prevent completion of a call by line hunt equipment to a nonbusy and unattended telephone set. The circuit includes a ringing signal recognition arrangement operable in response to a ringing signal of predetermined duration on the first line but not in response to transients or other spurious signals. When a ringing signal is detected, a control circuit places subsequent sequential subscriber lines in a false busy condition for a limited period of time.

6 Claims, 1 Drawing Figure

PATENTED DEC 31 1974 3,858,008
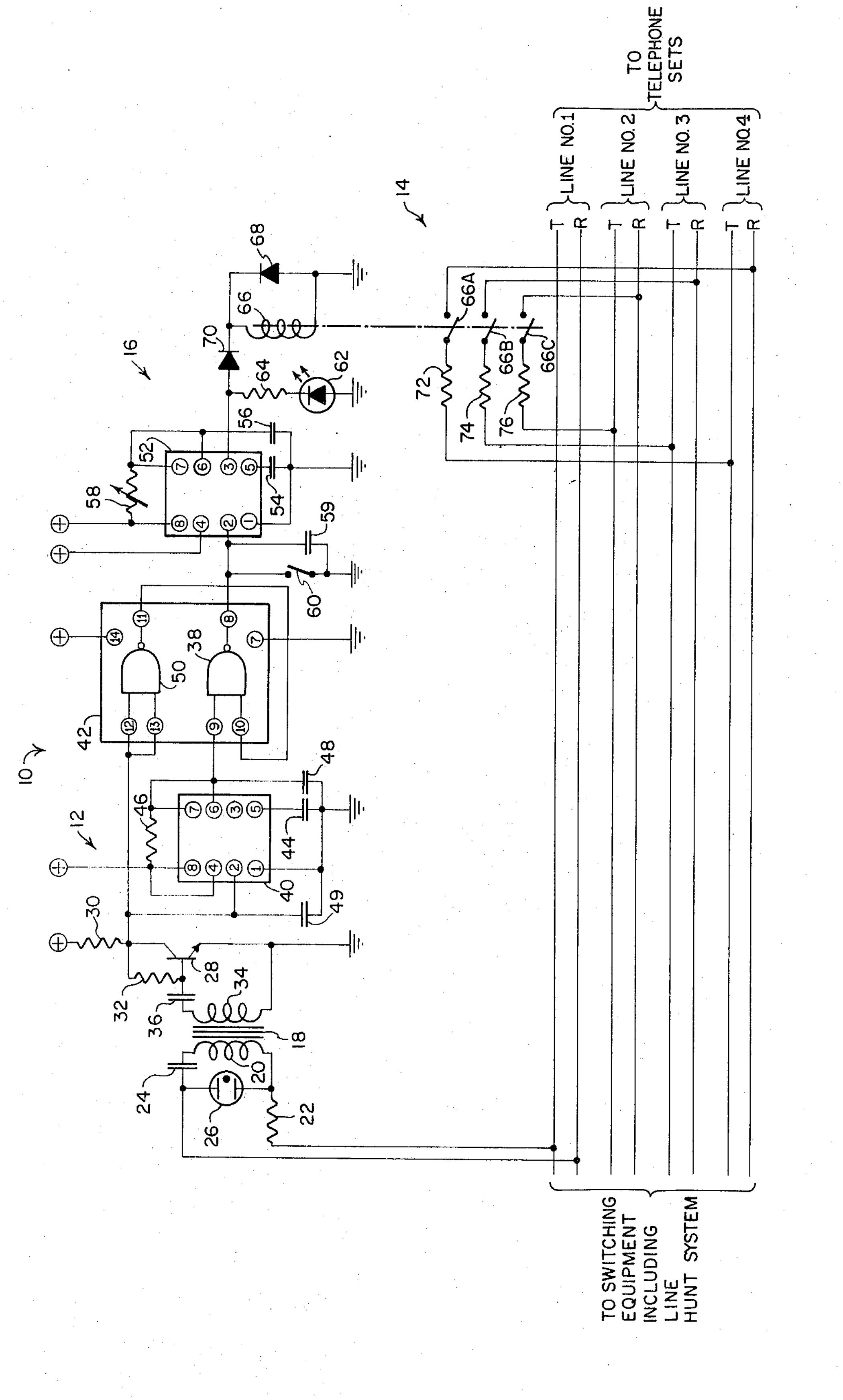

LINE BUSYING CIRCUIT

The present invention relates to a line busying circuit for use with telephone systems having line hunt equipment.

The present invention is useful with telephone systems having line hunt equipment. Among the types of telephone systems often including line hunt systems are internal or PBX systems, Centrex CU (customer unit) and Centrex CO (central office) systems, private automatic branch exchange or PABX systems, and others. Such telephone systems include automatic or manual switching equipment for interconnecting a plurality of outside telephone lines selectively with subscriber lines extending to telephone sets. In the operation of a line hunt system associated with the telephone system, the subscriber lines of the telephone have a predetermined sequence and if a call is attempted to a first telephone line while the first line is in a busy condition, the line hunt equipment switches the incoming call to the sequentially next nonbusy subscriber line.

It should be understood that the term "line hunt system" as used herein is intended to encompass rotary line hunt systems using rotary switches, as well as other equivalent arrangements which may use electronic switching, crossbar switches or other devices for accomplishing a similar function.

Under some circumstances it is desirable to prevent a call directed to a busy first line from being switched to a nonbusy sequential line. For example, the user of the telephone system may use a telephone answering service or answering machine for responding to calls placed on the first line during periods of time when the internal telephone sets are unattended. If a first call is completed on the first line to the telephone answering service or machine and a second call is attempted, the line hunt system would complete the second call to a sequentially next subscriber line. The second caller would reach a nonbusy, unanswered telephone set, and the purpose of utilizing a telephone answering service or machine would be defeated.

An object of the present invention is to provide a line busying circuit operable in response to use of a first sequential line of a system for busying subsequent lines of the system so that line hunt equipment associated with the system cannot complete a contemporaneous call to another, unattended telephone set. Other important objects are to provide a line busying circuit which includes a novel ringing signal recognition arrangement so that the circuit responds to a ringing signal on the first line but not to spurious signals, transient signals and the like; to provide a circuit which can easily be added to existing internal telephone systems and whch does not interfere with the operation of the outside telephone systems; and to provide a circuit which is simple, easy to use, economical, and reliable in operation.

In brief, the above and other objects of the present invention are achieved through the provision of a line busying circuit for use with a plurality of sequential subscriber lines associated with a telephone system having a line hunt system. The circuit comprises sensing means coupled to a sequentially first subscriber line for sensing use of the first line. A false busy circuit is connected to the subsequent subscriber lines, and means are provided for normally maintaining the subsequent subscriber lines in an undisturbed, operational condition. Control means are coupled between the sensing means and the false busy circuit. When use of the first line is sensed, the control means operates the false busy circuit to place the subsequent subscriber lines in a busy condition.

In accordance with a feature of the invention, a ringing signal on the first line is sensed by means of a novel ringing signal recognition circuit which detects not only the initiation of a ringing signal, but also detects the continuing presence of the ringing signal at a predetermined later time. In this manner, operation of the system due to spurious signals such as transients and the like is avoided.

The invention together with the above and other objects and advantages may be best understood from the following detailed description of an embodiment of the invention illustrated in the drawing. The single FIGURE of the drawing is a schematic diagram of a ine busying circuit embodying the present invention and associated with portions of a telephone system.

Having reference now to the drawing there is illustrated a line busying circuit designated as a whole by the reference numeral 10 and constructed in accordance with the principles of the present invention. The line busying circuit 10 is interconnected with the tip and ring conductors of a plurality of telephone lines, designated as lines 1, 2, 3 and 4, associated with a PBX or other telephone system. It will be apparent that the circuit 10 may be adapted for use with systems having more or fewer lines. In the illustrated arrangement each telephone line extends between a telephone set and switching equipment which functions to selectively establish connections between the telephone lines and outside telephone lines associated with an outside telephone system. The switching equipment includes a line hunt system operating in conventional manner to extend connections from calling lines to telephone lines No. 1, 2, 3 and 4 in sequential manner. Thus, if the first line designated as line No. 1 is busy and another call is received, the line hunt system sequentially searches for a nonbusy line among lines 2, 3 and 4 and extends a connection to the first detected nonbusy line.

In accordance with the present invention, the line busying circuit 10 prevents the connection of a calling external line to an unbusy subsequent line when the first line is in use. For example, the line busying circuit 10 can be used when the telephone sets associated with the system are unattended and when the first line is interconnected to an answering service or automatic answering machine. When used in this manner, the circuit 10 of the present invention prevents the undesirable possibility of a caller reaching an unattended, nonbusy line.

In general, the line busying circuit 10 of the present invention includes a ringing signal recognition circuit generally designated by the reference numeral 12 coupled to telephone line No. 1. The circuit 10 further includes a false busy circuit arrangement generally designated as 14 connected to sequentially subsequent lines Nos. 2, 3 and 4. A control circuit generally designated as 16 is coupled between the ringing signal detection circuit 12 and the false busy circuit arrangement 14 for placing lines 2, 3 and 4 in a busy condition in response to the presence of a ringing signal on line No. 1.

In accordance with the present invention, the ringing signal recognition circuit 12 operates reliably to respond to the presence of a ringing signal on the sequentially first telephone line No. 1, while not responding to spurious signals, transients and the like. Telephone ringing signals may vary to some degree in dependence upon telephone system operating standards. However, ringing signals used by telephone utilities have a generally sinusoidal component with a frequency of between about fifteen and about one hundred hertz and an RMS voltage in the range of from about forty to about one hundred volts. The minimum ring time of ringing signals used by telephone systems is about one second. On the other hand, spurious signals and transients which may appear on a telephone line are typically characterized by short duration. The novel recognition circuit 12 distinguishes between ringing signals and spurious signals by providing an output signal only when signal perturbations persist on the telephone line for a predetermined period of time.

Proceeding now to a more detailed description of the ringing signal recognition circuit 12, the circuit includes a transformer 18 having a primary winding 20 connected across the tip and ring conductors of line No. 1 in circuit with a current limiting resistor 22 and a DC blocking capacitor 24. In order to provide overload protection for the circuit 10, a gas discharge tube 26 is connected in series with the resistor 22 across the tip and ring conductors of telephone line No. 1 and, in known manner, provides a low resistance path upon ionization to large voltage surges.

When a call is made to telephone line No. 1, the ringing signal applied to the tip and ring conductors is coupled by the transformer 18 to an amplifier including a transistor 28. Transistor 28 is connected in a common emitter configuration and is normally biased to a nonconductive condition by means of resistors 30 and 32 connected between a source of positive potential and the collector and base electrodes. When a ringing signal is received, it is coupled through a secondary winding 34 of transformer 18 and a coupling capacitor 36 to the base-emitter junction of transistor 28. Application of a ringing signal to the recognition circuit 12 therefore results in the transistor 28 alternately being rendered conductive and nonconductive at a frequency equal to the frequency of the sinusoidal component of the ringing signal.

As indicated above, the ringing signal recognition circuit 12 is designed to respond only to true ringing signals, and not to spurious signals, transients and the like. In accordance with the invention the ringing signal recognition circuit 12 is placed into operation at the initiation of a ringing signal, but does not provide an output signal unless a ringing signal of substantial duration is present on the telephone line.

In order to detect the presence of ringing signals of substantial duration, the recognition circuit 12 includes a NAND gate 38 having one input coupled to the output of the transistor amplifier 28 and a second input controlled by a timer 40 which is in turn coupled to the output of the transistor amplifier 28. Consequently, in order for the NAND gate 38 to operate and provide an output signal, it is necessary for a ringing signal to initiate operation of timer 40, and for the ringing signal to persist during a predetermined time delay period after which the timer 40 applies a signal to the NAND gate 38.

In the illustrated embodiment of the invention, the gate 38 and timer 40 are in the form of integrated circuit devices. It should be understood, however, that circuits composed of discrete components may be used if desired. Gate 38 is part of an integrated circuit logic module designated as a whole by the reference numeral 42, and of the type sold by Fairchild Camera and Instrument Corp. as No. 9N00/7400. Module 42 is biased for operation by connection of its terminals No. 7 and No. 14 respectively to sources of relatively negative and relatively positive potential. Gate 38 has two inputs comprising terminals No. 9 and No. 10 of module 42, and an output comprising terminal No. 8 of module 42. In the operation of gate 38, the output signal appearing at terminal No. 8 is normally at a relatively high potential, and decreases to a relatively lower potential if and only if relatively high potentials appear at both input terminals No. 9 and No. 10.

Timer 40 is an integrated circuit module sold by Signetics Corp. As No. NE555V and is biased for operation by connection of its terminals No. 1, 5, 4 and 8 to points of reference potential as illustrated, with terminal No. 5 being connected to ground reference potential by a capacitor 44. In operation, when the potential appearing at input terminal No. 2 changes from a relatively higher potential to a relatively lower potential, the timer 40 is placed into operation. As used in the illustrated embodiment, terminal No. 6 comprises the timer output terminal, and as timer 40 operates, the potential appearing at terminal No. 6 gradually increases in a so-called ramp function from a relatively low value to a relatively high value. The operating time or slope of the ramp function is determined by the values of a resistor 46 and a capacitor 48 coupled between terminal No. 6 and positive and ground power supply terminals. A capacitor 49 coupled between input terminal No. 2 and ground provides a time delay for stable operation of the timer 40.

When a ringing signal is received on telephone line No. 1, input terminal No. 10 of gate 38 is repetitively operated by a periodically negative-going signal coupled from transistor 28 by a second NAND gate 50 of module 42 serving as an inverter and pulse-forming circuit. More specifically, the collector of transistor 28 is connected in common to terminals No. 12 and No. 13 of module 42,-i.e., the inputs of gate 50. When transistor 28 is periodically rendered conductive by the sinusoidal ringing signal component, the periodic relatively low potential signal applied to both inputs of gate 50 causes the output of gate 50 appearing at terminal No. 11 to change periodically from a relatively low potential to a relatively high potential.

Since the output of gate 50 is connected to the input of gate 38 designated as module terminal 10, this gate input is repetitively operated throughout the duration of a ringing signal. However, the other input of gate 38 is not operated at this time due to the low potential initially present at output terminal No. 6 of timer 40.

As transistor 28 begins to periodically conduct at the inception of a ringing signal, operation of timer 40 is initiated as the potential of terminal No. 2 decreases. After a predetermined time delay period, for example in the range of from one-quarter to one-half second, the potential appearing at output terminal No. 6 increases to a value high enough to operate gate 38 in conjunction with the signal periodically applied to gate 38 by operation of gate 50. At this time the output of gate 38 decreases to a relatively low potential as a reliable indication that a ringing signal is present on telephone line No. 1.

Advantageously, if a spurious signal is present on line No. 1 rather than a ringing signal, gate 38 is not operated. A spurious signal other than a ringing signal may initiate operation of the timer 40. However, because the spurious signal does not persist until the end of the time delay period, input terminal No. 10 of gate 38 is no longer operated at the time that input terminal No. 9 is operated by the timer 40.

When the ringing signal recognition circuit 12 provides an output signal in the form of a decrease in the potential at terminal No. 8 of module 42, the control circuit 16 is operated in order to cause the false busy circuit arrangement 14 to apply a false busy signal to lines No. 2, 3 and 4. More specifically, control circuit 16 includes a timer 52 which in the illustrated embodiment is an integrated circuit timer module identical to timer 40 described in detail above. Timer 52 is biased for operation by interconnection of its terminals No. 1, 4, 5 and 8 to sources of operating potential as illustrated, with terminal No. 5 being coupled to ground reference potential by a capacitor 54. A capacitor 56 and a resistor 58 are connected between terminal No. 6 and the power supply terminals. Resistor 58 is preferably variable in order to adjust the duration of operation of the timer 52. A capacitor 59 provides a time delay for stability in operation.

In the use of timer 52, terminal No. 3 serves as the output terminal. Normally terminal No. 3 is maintained at a relatively low potential. When input terminal No. 2 of timer 52 is operated by the application of a relatively low potential, terminal No. 3 is operated to a constant relatively high potential, which relatively high potential is maintained throughout the time of operation of timer 52.

Control circuit 16 may be operated by operation of gate 38 in response to a ringing signal in the manner described above. In order to provide for testing of the line busying circuit 10 or for manual operation thereof, there is provided a momentary closing manual switch 60 coupled between the input terminal No. 2 of timer 52 and a source of ground reference potential.

To provide a visible indication of operation of the line busying circuit 10, an indicator in the form of a light emitting diode 62 is connected in series with a resistor 64 between the output terminal No. 3 of timer 52 and ground. Consequently, whenever the timer 52 is operated, the diode 62 is energized to provide a visible indication.

Having reference now more particularly to the false busy circuit arrangement 14, a relay including a winding 66 is connected to be energized during operation of the timer 52. More specifically, winding 66 shunted by a diode 68 is connected between ground and terminal No. 3 of timer 52 in series with a diode 70. Thus, whenever terminal No. 3 of timer 52 is at a relatively high potential, relay winding 66 is energized.

Associated with winding 66 are a plurality of normally open sets of relay contacts 66A, 66B and 66C. These sets of contacts are connected in series with resistors 72, 74 and 76 respectively across the tip and ring conductors of telephone lines No. 2, 3 and 4. When relay 66 is operated, its associated sets of relay contacts close in order to complete a resistive shunt across each of lines 2, 3 and 4 in order to provide a false busy condition.

The operation of the line busying circuit 10 of the present invention will be apparent to those skilled in the art in light of the preceding detailed description. During normal use of the telephone system when the telephone sets connected to lines No. 1, 2, 3 and 4 are attended, the circuit 10 is deactivated either by disconnecting the circuit from the telephone lines, or preferably by deenergizing the DC power supply used to operate the circuit 10.

In the event that the telephone sets are unattended for a period of time and a connection is extended from line No. 1 to a telephone answering service or machine, the line busying circuit 10 may be used with advantage. If a first call is attempted to line No. 1 under these circumstances, the call is answered by the telephone answering service or machine. The ringing signal appearing on line 1 initiating the call is coupled by transformer 18 to periodically render transistor 28 conductive. As a result, the timer 40 is placed into operation and simultaneously, periodic operating signals are applied through gate 50 to one input of gate 38. After a predetermined time delay period, the other input of gate 38 is also operated and timer 52 is placed into operation. At this time, a visible indication is provided by the light emitting diode 62 and relay 66 is energized in order to apply a false busy condition to each of the sequentially subsequent telephone lines No. 2, 3 and 4. Variable resistor 58 is adjusted to provide for a desired duration of operation of timer 52. Preferably, the time delay period may be adjusted within the range of about thirty seconds to a few minutes so that in normal usage the subsequent lines will remain busy throughout the period of time that line No. 1 is in use.

Circuit 10 is simple and highly reliable in operation. The ringing signal recognition circuit 12 is reliable in responding only to ringing signals and not to most spurious signals. The circuit 10 may be interconnected with a local telephone system quite easily by a signal connection with each tip and ring conductor at any convenient terminal point. When deenergized, the circuit 10 has no effect on operation of the telephone system. When in use, unless a call has recently been initiated to line No. 1, the circuit 10 maintains the lines of the telephone system is undisturbed and operational condition. Moreover, when a call is initiated on line No. 1, the remaining circuits are placed in a busy condition for only a brief interval of time as determined by the setting of timer 52 so that operation of the outside telephone system is not seriously disturbed.

Although the invention has been described with reference to details of the illustrated embodiment, other modifications and embodiments may be devised by those skilled in the art. It should be understood that details of the illustrated embodiment do not limit the invention as defined in the following claims.

What is claimed and desired to be secured by Letters Patent of the United States is:

1. A line busying circuit for use with a plurality of sequential telephone lines associated with a telephone system having line hunt equipment, said circuit comprising:

sensing means coupled to a sequentially first line for sensing use of said first line;

a false busy circuit connected to at least one line subsequent to said first line;

means for normally maintaining said subsequent line in an undisturbed condition; and control means coupled between said sensing means and said false busy circuit and operable in response to the sensing of use of said first line for operating said false busy circuit to place said subsequent line in a busy condition;

said sensing means including first detecting means for detecting the inception of a signal on the first line, second detecting means for detecting the persistance of the signal after a predetermined time delay, and means for providing an output signal only when inception and persistance of a signal are detected.

2. The line busying circuit of claim 1, said first and second detecting means comprising means for detecting the presence of a ringing signal on said first line.

3. The line busying circuit of claim 1, said control means including timer means for returning said subsequent lines to the undisturbed condition a predetermined time after sensing of use of said first line.

4. The line busying circuit of claim 1, said false busy circuit including resistance means and switching means coupled to said subsequent line.

5. A line busying circuit for use with a plurality of sequential telephone lines associated with line hunt equipment, said line busying circuit comprising:

an amplifier coupled to the sequentially first line;

a gate having two inputs and an output;

one gate input being coupled to said amplifier for operation in response to presence of a signal on the first line;

a time coupled between said amplifier and the second gate input for operating the second gate input a predetermined time after presence of a signal on the first line;

and means connected between the gate output and at least one sequentially subsequent line for busying said subsequent line in response to simultaneous operation of both said gate inputs.

6. The line busying circuit of claim 5, said last mentioned means including a second timer coupled to said gate output, a relay winding energized for a predetermined interval upon operation of said second timer, at least one set of normally open relay contacts controlled by said winding, and resistive means in circuit with said contacts and with said subsequent line.

* * * * *